United States Patent [19]

Yuill

[11] Patent Number: 4,756,724
[45] Date of Patent: Jul. 12, 1988

[54] EXTRACTING RADON GASES FROM A DOMESTIC WATER SUPPLY

[76] Inventor: Grenville K. Yuill, 1441 Pembina Highway, Winnipeg, Manitoba, Canada, R3T 2C4

[21] Appl. No.: 937,313

[22] Filed: Dec. 3, 1986

[51] Int. Cl.$^4$ .............................................. B01D 53/00
[52] U.S. Cl. .................................. 55/165; 55/269; 55/66; 165/DIG. 917
[58] Field of Search ................... 55/55, 66, 165, 42, 55/189, 208; 165/66, DIG. 917

[56] References Cited

U.S. PATENT DOCUMENTS

| | | | |
|---|---|---|---|
| 1,654,260 | 12/1927 | Jones | 55/165 |
| 3,377,778 | 4/1968 | Gaevtner | 55/208 |
| 3,608,279 | 9/1971 | West | 55/486 |
| 3,756,412 | 4/1973 | Barrow | 210/180 |
| 4,047,561 | 9/1977 | Jaster et al. | 165/DIG. 917 |
| 4,371,383 | 1/1983 | Rost | 55/169 |

FOREIGN PATENT DOCUMENTS

| | | |
|---|---|---|
| 548501 | 11/1957 | Canada. |
| 788282 | 6/1968 | Canada. |
| 3012590 | 5/1983 | Fed. Rep. of Germany. |
| 218278 | 1/1982 | German Democratic Rep.. |

Primary Examiner—Bernard Nozick
Attorney, Agent, or Firm—Adrian D. Battison; Stanley G. Ade; Murray E. Thrift

[57] ABSTRACT

A water supply system for a building provides extraction of radon from the water using a hot water tank which is supplied with cold inlet water via a float valve with the tank closed apart from hot water outlet and a vent to the atmosphere of sufficient size to allow escape of gases coming out of solution from the water in the tank. The water is heated to a temperature preferably above the desired temperature and then recooled in a heat exchanger cooperating with the cold inlet. The heat exchanger can supply both heated water and cooled water from the water extracted from the hot tank. This technique extracts up to 90% of the radon with very little additional equipment of energy costs.

9 Claims, 2 Drawing Sheets

EXTRACTING RADON GASES FROM A DOMESTIC WATER SUPPLY

BACKGROUND OF THE INVENTION

This invention relates to an apparatus for supplying water for use in a building and particularly to an apparatus which extracts from the water radon by a degasifying technique.

All mineral materials contain uranium in greater or lesser amounts. This uranium decays through a chain of other isotopes to produce radon-222, which has a half-life of 3.8 days. Radon is a gas which can get into indoor air through several paths. When radon decays, it produces a chain of short-lived daughters which can become bound to the walls of the lungs. When they decay, the radiation damages lung tissue and it is a significant cause of lung cancer. It is estimated that approximately 1,000 Canadians are killed each year by lung cancer resulting from the radioactive decay of radon daughters.

One significant path for radon to reach indoor air is through well water. Radon gas is dissolved into this water underground, due to the high solubility of gases in cold water. This water is then pumped into the pressurized household water system, then heated in a hot water tank. The randon does not come out of solution, in spite of the increase in temperature and the corresponding decrease in solubility, because of the pressure. However, when the hot water is throttled through a tap into the house, the radon is released into the household air. This is particular problem in showers and baths, where large volumes of water are used, but it also occurs in dish and clothes washing.

Municipal water systems which draw their water from rivers and streams are relatively free of radon. Well water systems, whether municipal or private often contain significant amounts of dissolved radon. Attention has been given therefore to the removal of radon from the water supply system of a building.

For example U.S. Pat. No. 4,371,383 (Rost issued Feb. 1, 1983) discloses a tank which is placed additionally into the water supply line of a building in which the water entering the building is sprayed in a fine mist onto a number of separation plates. This arrangement has not met with significant commercial success in view of the fact that the technique does not result in a high removal of the radon and in view of the fact that the equipment required is an addition to the conventional water supply system and accordingly constitutes an additional expense which many people will not bear for a problem which is not itself readily apparent.

East German Patent Application No. 218278 published Feb. 6, 1985 by Glaeser et al discloses an arrangement in which vapour issued on the reduction of pressure from hot water sprayed by nozzles inside a storage tank is partly condensed by make up water descending a trickle-tower mounted upwardly of and connected to the tank. The arrangement therefor uses again a spray technique and the device is intended as an additional piece of equipment in the building supply system. Furthermore the device is apparently intended as a large scale device for a district heating system as opposed to a water supply apparatus for a domestic or like building.

German Patent Application No. 3012590 discloses a hot water tank arrangement including a heating element, a cold water inlet at the base of the tank and, at the top of the tank, a hot water outlet and a gas outlet. The hot water outlet includes a gas trap which prevents gas escape. The gas outlet includes a control valve which prevents liquid escape but allows the gas to freely exit to atmosphere. The water within the tank is however maintained at operating pressure of the order of 40 p.s.i. and this will prevent or seriously inhibit the escape of gas and particularly radon from the tank. The arrangement therefore has not been effective and has not achieved commercial success.

It is one object of the present invention, therefore, to provide an improved water supply system which enable the extraction of radon gas from the water supply while using the requirement for heated water in the building to provide the energy of the gasification.

According to the invention, therefore, there is provided an apparatus for supplying water for use in a building comprising a substantially closed tank, a water inlet line into the tank, level sensing means for determining the level of water in the tank, valve means in said inlet line actuated by said level sensing means for maintaining the level above a predetermined minimum and below a predetermined maximum, heating means in the tank for heating the water, thermostat means for controlling said heating means so as to retain the temperature of the water below a boiling temperature, and vent means communicating with the tank above the maximum level and arranged to communicate with the atmosphere exteriorally of the building so as to release gases in the tank above said water level to atmosphere and so as to maintain pressure in said tank at atmospheric pressure.

Preferably the thermostat is arranged such that the water in the tank is heated to a temperature greater than the desired temperature of the heated water and there is provided a heat exchanger downstream from and separate from the tank for cooling the heated water with the water supply down to the required temperature.

In a further preferred arrangement, there is provided a larger heat exchanger in which the heated outlet water is cooled firstly to a desired temperature for heated water and secondly to a desired temperature for cool supply water. A heat pump may be used to further cool the cool water supply from the outlet water.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
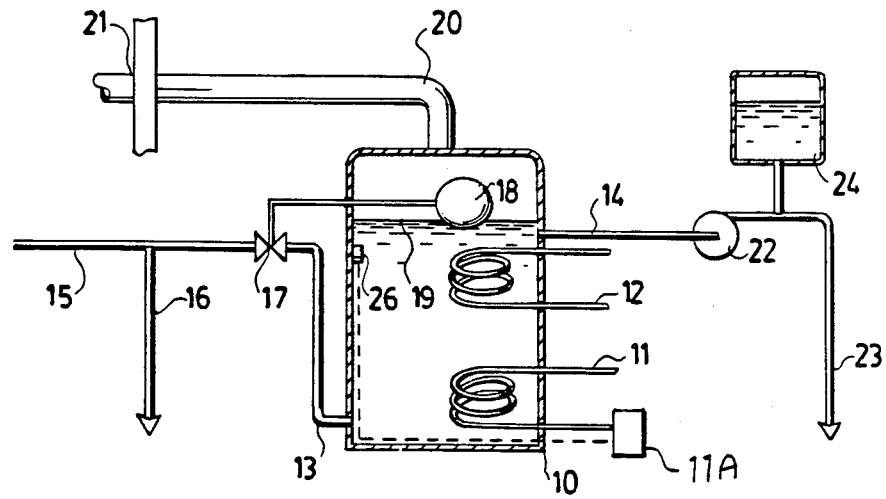
FIG. 1 is a schematic side elevational view of a first embodiment of water supply apparatus according to the invention.

Turning firstly to FIG. 1, the apparatus comprises a tank 10 which has first and second heating elements 11 and 12 which are illustrated schematically as electric heating elements but they can of course be a gas heating system or an oil heating system as required. A thermostat 26 is provided for actuating a control device schematically indicated at 11A controlling the heater 11.

The tank 10 is a closed tank apart from a water inlet 13 at the bottom of the tank and a water outlet 14 adjacent the top of the tank. The water inlet 13 is connected to a water supply 15 which is under pressure for example from a well pump. A separate duct 16 can be used to supply cold water directly from the supply 15 without degasification. A valve 17 controls the supply of water to the inlet 13 in dependence upon the position of a float 18 so that the level of water indicated at 19 can be controlled within predetermined limits.

At the top of the closed tank 10 is provided a vent 20 which is open and uncontrolled by any valving arrangements so that the pressure within the tank 10 is controlled by the pressure exteriorally of the vent 20 at an exterior opening 21 of the vent 20. Thus atmospheric pressure is communicated to the interior of the tank. The size of the vent is such that it allows gases within the upper area of the tank to be exchanged with atmospheric air outside of the building. For this purpose the diameter of the vent duct will be of the order of two inches and preferably within the range one to five inches.

The tank is thus closed apart from the inlet 13, outlet 14 and vent 20. Water from the outlet 14 is pressurized by a pump 22 for supply to a hot water system indicated at 23 with a compression tank 24 of conventional construction provided to avoid cycling of the pump 22.

The water in the tank 10 is therefore heated to a temperature of the order of 65° C. at atmospheric pressure which will cause approximately 70% of the radon to be removed from solution in the water and expelled through the vent 20.

Figure 2:
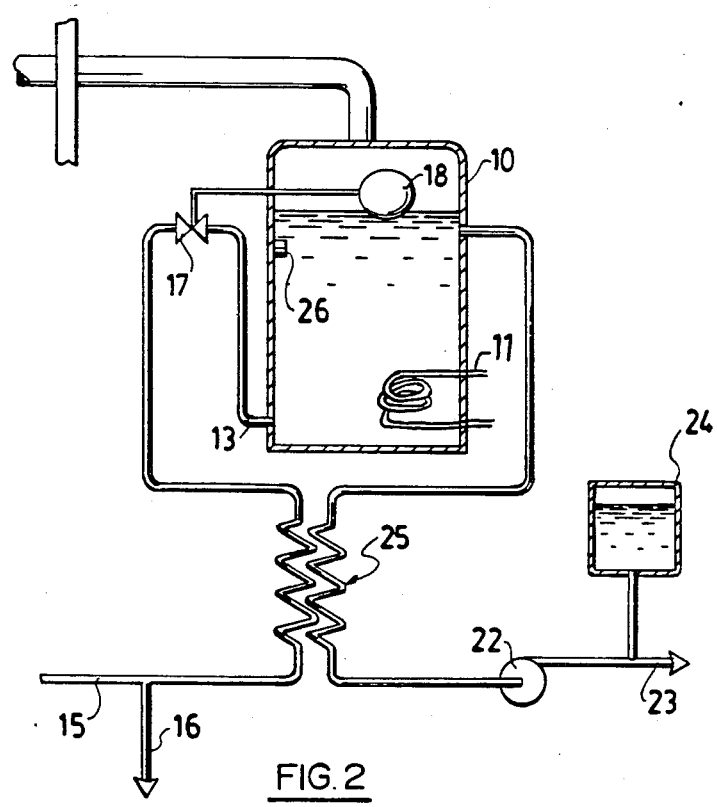
FIG. 2 is a schematic side elevational view of a second embodiment according to the invention.

Turning now to FIG. 2, the system generally indicated in FIG. 1 is supplemented by the addition of a heat exchanger schematically indicated at 25. This enables the thermostat schematically indicated at 26 to be set to a temperature higher than the desired temperature generally of 65° C. with the higher temperature being for example 85° C. It will of course be appreciated that the higher the temperature to which the water is heated in the tank the greater the release of radon and of the dissolved gases. However, an elevated hot water supply temperature is unsafe since it will increase the incidence of scalding accidents. Also the heat loss from water supply lines will be increased. Thus the heat exchanger 25 is a heat recovery heat exchanger which will preheat the cold water supply by about 20° C. and will cool the hot water from the tank from about 85° C. to about 65° C.

Figure 3:
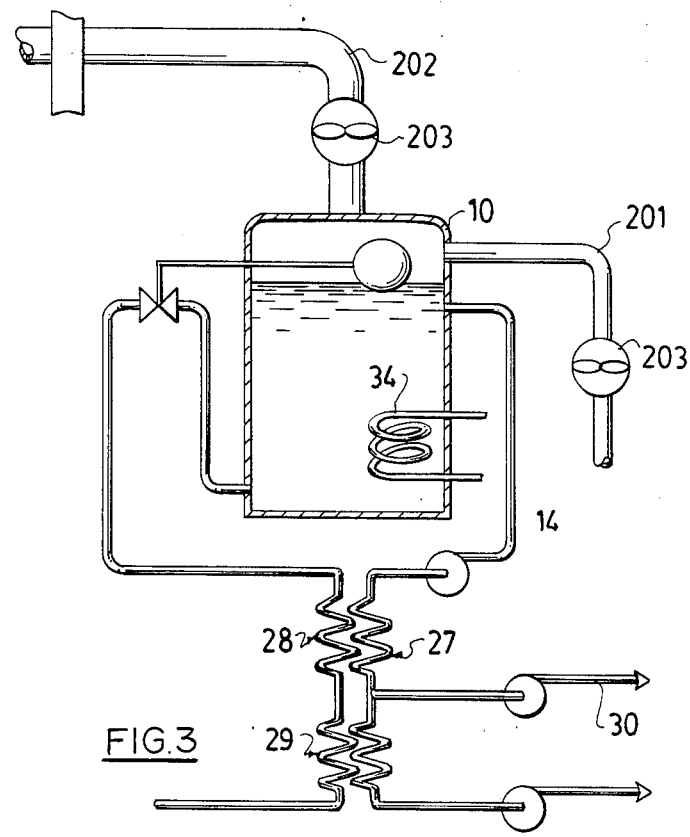
FIG. 3 is a schematic side elevational view of a third embodiment according to the invention.

Turning now to FIG. 3, the system of FIG. 1 and FIG. 3 is yet further supplemented by a modified heat exchanger 27 which is constituted by two exchanger parts 28 and 29. As indicated schematically, the first exchanger part 28 is arranged to reduce the temperature of the outlet water on the line 14 from 85° C. within the tank 10° to 65° C. for supply as heated water on the line 30. The second heat exchanger part 29 is arranged to yet further cool a portion of the outlet water to a temperature of the order of 15° C. for supply as conventional cool water. This overcomes the problem where radon gas may be released into the air in a house by cold water which becomes warmed as it is used. This release is particularly prevelant when cold water and hot water are mixed for example in a shower. In the arrangement of FIG. 3, the heat exchanger has to be of a significant size or the cold water supply to the house will be at a higher temperature than most householders would want.

In addition, the arrangement of FIG. 3 uses two vent ducts, one 201 to supply air to the tank (possibly from inside the house) and one 202 to remove the radon laden air. The air flow can be by natural convection in view of the fact that the inlet is below the outlet or driven by a fan 203 or fans in the ducts.

Figure 4:
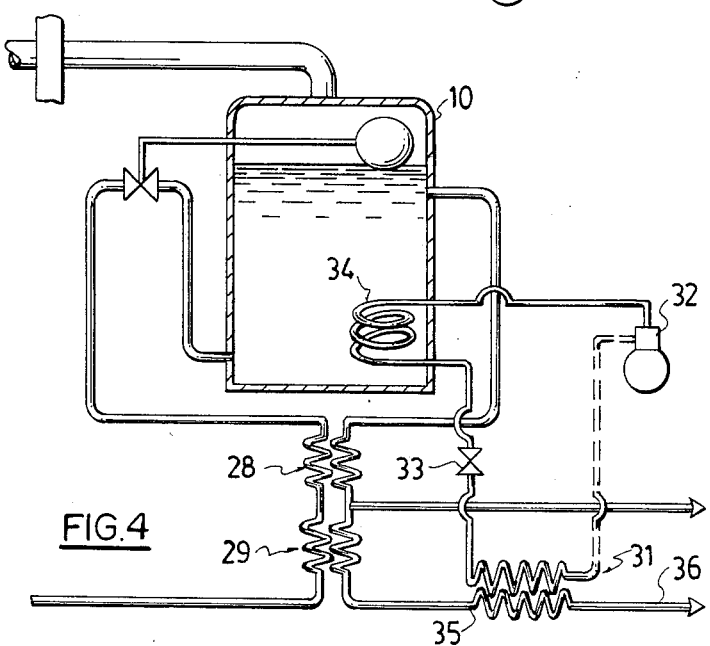
FIG. 4 is a schematic side elevational view of a fourth embodiment to the invention.

A yet further arrangement is therefore shown in FIG. 4 which constitutes substantially the same construction as shown in FIG. 3 but in addition there is provided a heat pump 31 including a compressor 32, expansion valve 33 and coil 34 positioned within the tank 10. Thus the heat pump acts to further cool the outlet water on the line 35 down to a preferred level of the order of 5° C. on the line 36. The heat extracted by the heat pump is of course used to further heat the water in the tank 10 in conjunction with the heating coils as previously described.

The embodments therefore provide a system in which the extraction of radon is at a very high percentage, for example of the order of 90% at 85° C. at atmospheric pressure, while using energy and equipment normally required for the heating of water for the domestic or building water supply. The equipment therefore is of very little additional expense relative to the conventional water heating tank and requires very little additional energy.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for supplying water for use in a building comprising a substantially closed tank, a water inlet line into the tank, level sensing means for determining the level of water in the tank, valve means in said inlet line actuated by said level sensing means for maintaining the level above a predetermined minimum and below a predetermined maximum, heating means in the tank for heating the water, thermostat means for controlling said heating means so as to retain the temperature of the water below a boiling temperature, a hot water outlet line and vent means communicating with the tank above the maximum level and arranged to communicate with the atmosphere exteriorally of the building so as to release gases in the tank above said water level to atmosphere and so as to maintain pressure in said tank at atmospheric pressure.

2. The invention according to claim 1 wherein said vent means provides direct, open, uncontrolled communication from said tank to said atmosphere exteriorally of the building.

3. The invention according to claim 1 including a pump in said outlet line for generating pressure in said water in said outlet line for supply to said building.

4. The invention according to claim 1 wherein the vent means comprises a first vent duct and a second vent duct and means arranged to generate an air flow into said tank through said first duct and out of said tank through said second duct.

5. The invention according to claim 1 wherein said thermostat is arranged such that the water is heated to a temperature above a desired temperature and wherein there is provided means for cooling the heated water in said outlet line.

6. The invention according to claim 5 wherein said cooling means comprises a heat exchanger means for transferring heat from the heated water to supply water at said inlet line.

7. The invention according to claim 5 including a first outlet supply duct and a second outlet supply duct each for receiving water from said outlet line and means for cooling water in at least said second outlet supply duct for supply to the building as cool water.

8. The invention according to claim 7 including heat exchanger means having a first portion for cooling said water in said outlet line to a first temperature for supply through said first outlet supply duct as heated water to said building and a second portion for further cooling said water in said outlet line to a second temperature for supply to said building through said second outlet supply means as cool water.

9. The invention according to claim 8 including heat pump means in said second outlet supply means for further cooling said water in said second supply duct, said heat pump means being arranged to communicate heat extracted from said second outlet supply duct to said tank.

* * * * *